March 28, 1967 L. L. CRAWFORD ET AL 3,311,222
CONVEYOR
Filed May 20, 1965 4 Sheets-Sheet 1
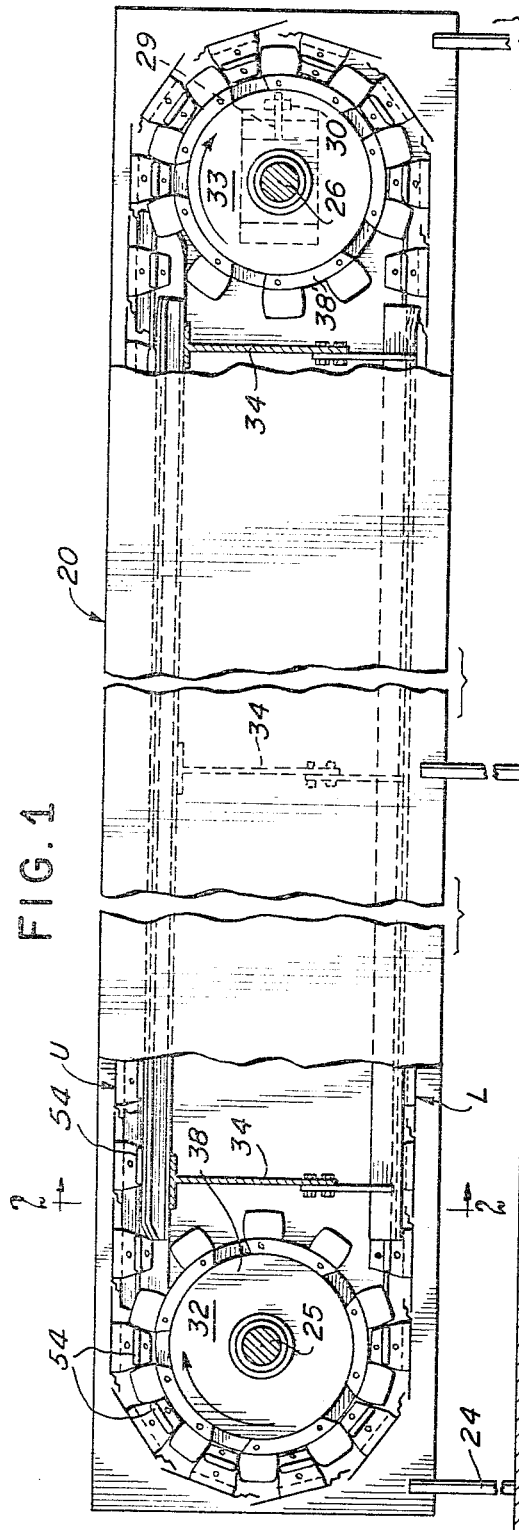
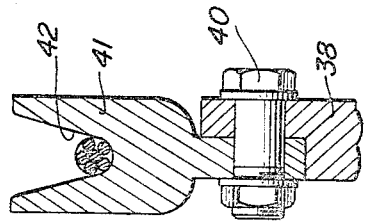
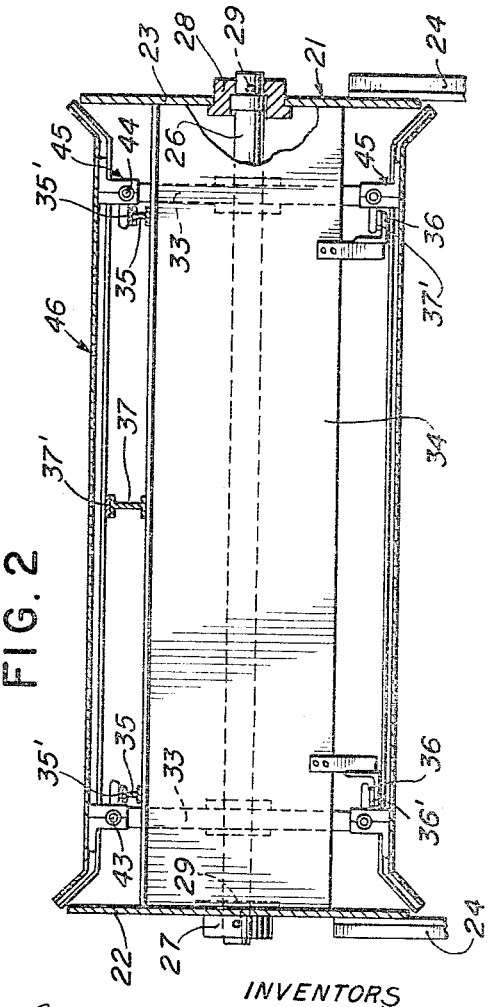
INVENTORS
Louis L. Crawford
Thor E. Christensen
BY
ATTORNEY.

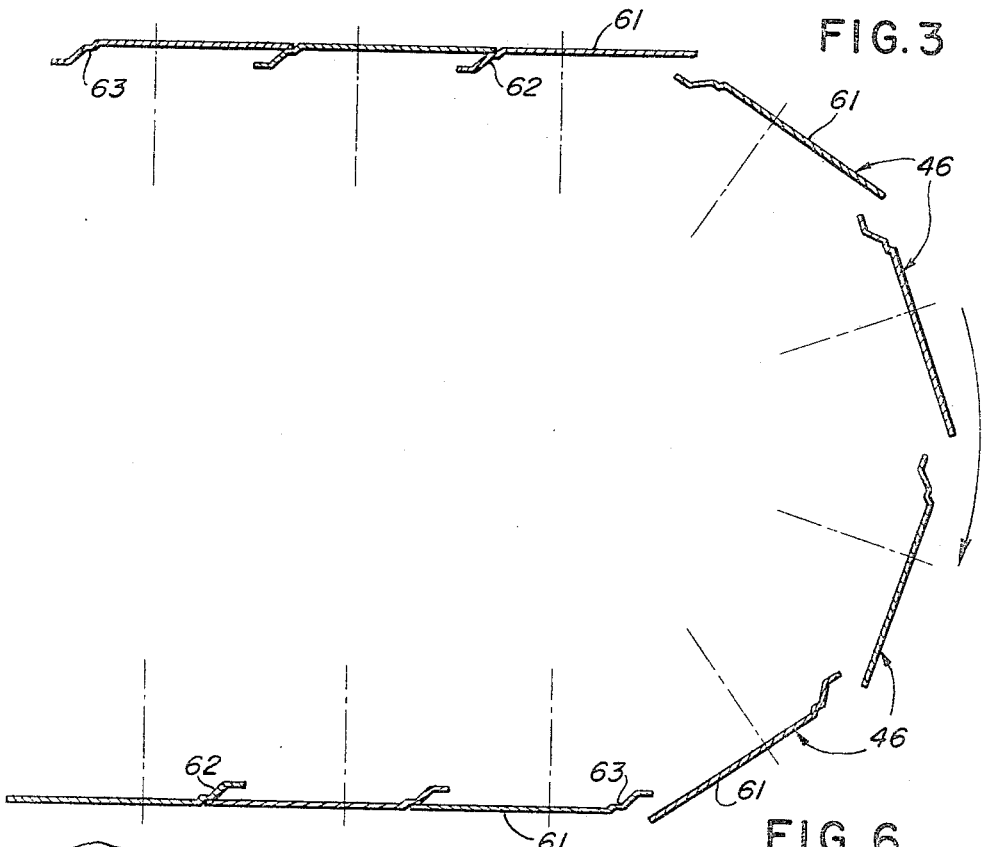
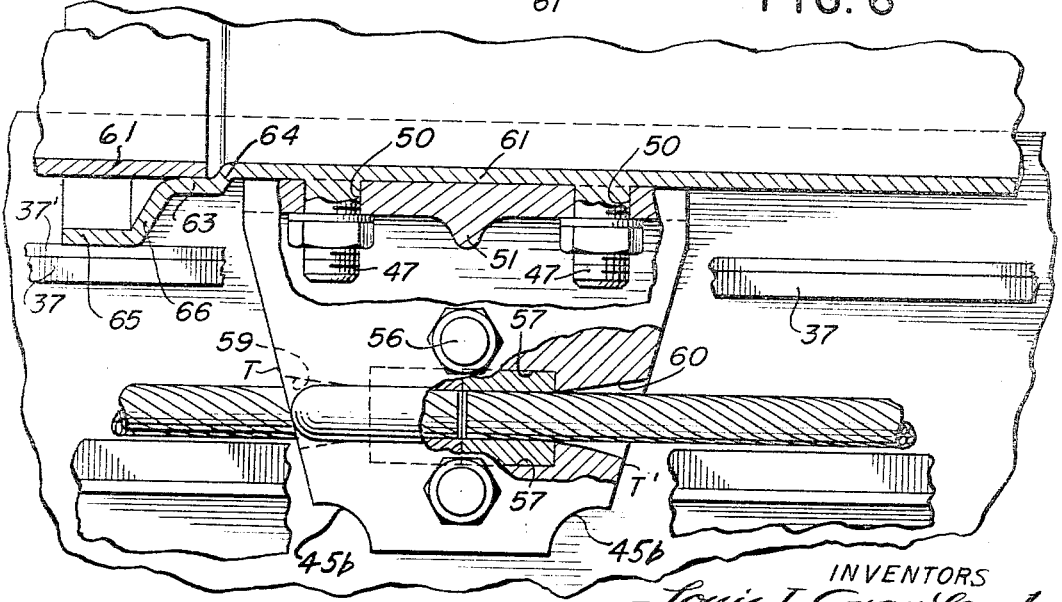

March 28, 1967   L. L. CRAWFORD ET AL   3,311,222
CONVEYOR
Filed May 20, 1965   4 Sheets-Sheet 4
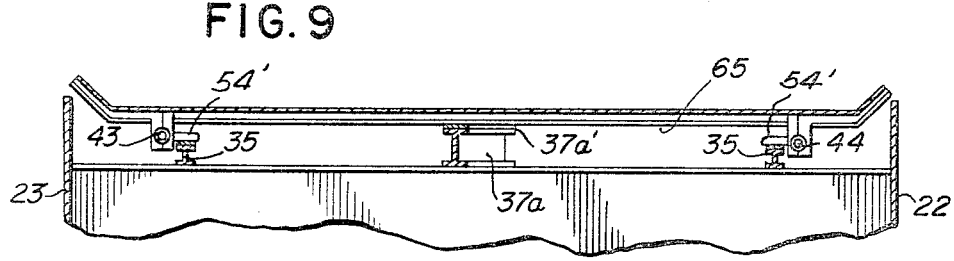
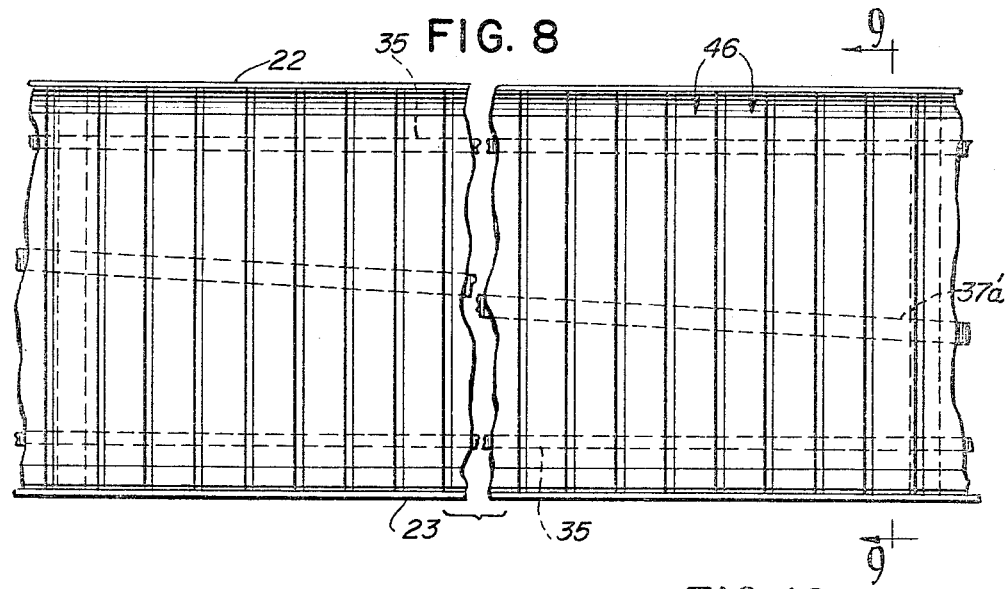
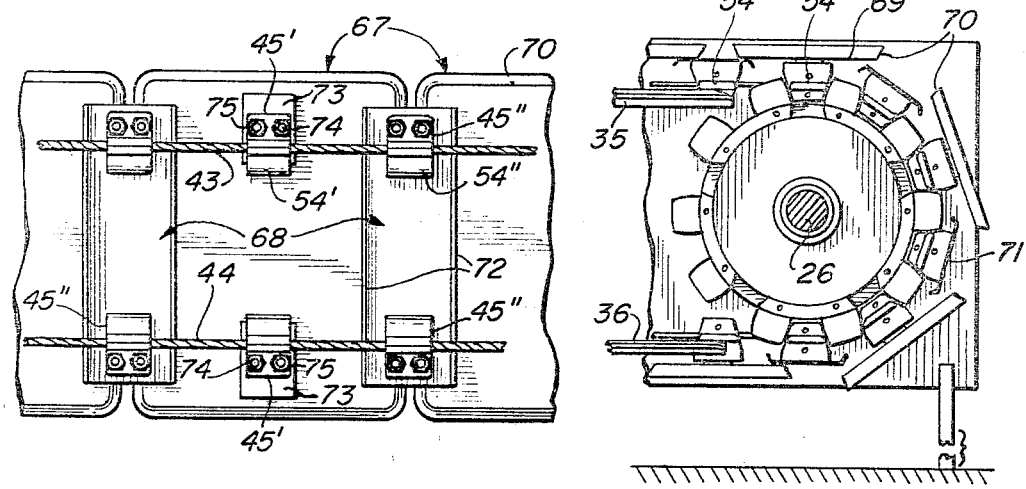
INVENTOR.
Louis L. Crawford
Thor E. Christensen
BY
ATTORNEY

United States Patent Office 3,311,222
Patented Mar. 28, 1967

3,311,222
CONVEYOR
Louis L. Crawford, Chicago, and Thor E. Christensen, Maywood, Ill., assignors to Chemetron Corporation, Chicago, Ill., a corporation of Delaware
Filed May 20, 1965, Ser. No. 457,335
9 Claims. (Cl. 198—196)

This invention relates to a conveyor and particularly to a conveyor which is especially useful as a viscera table conveyor.

Apparatus for carrying out the invention includes a longitudinally extending frame having spaced apart sprockets at each end of the frame, with spaced apart endless flexible cables trained around grooves in the teeth of related sprockets at each side of the frame, transversely extending load carrying members bracketed to the cables, longitudinally extending upper and lower supports disposed at each side of the frame, the brackets being constructed so that the upper run and the lower run of the conveyor can be supported for sliding movement by the brackets, the brackets and sprockets being constructed so that the sprockets drive the cables through engagement with the sprockets. In the form of the invention, each load carrying member has a flat portion and a marginal side portion underlying an adjacent load carrying member, each of the marginal portions includes a first flange having a flat upper surface which supports an adjacent load carrying member, a first web joining the first flange and the flat portion and being dimensioned so that the upper surfaces of adjacent flat portions lie in one plane, a second flange having a lower surface in a plane generally parallel to and below the plane of the upper surface of the first flange for slidable engagement with an upper support in a central zone between the upper side supports and a second web joining the first and second flanges. In another form of the invention, instead of providing the load carrying member described above, the load carrying members are in the form of pans and supports, with each support underlying marginal portions of adjacent pans.

In the illustrative drawings:

FIGURE 1 is an elevational view of a conveyor in accordance with the invention;

FIGURE 2 is a sectional view taken along line 2—2 of FIGURE 1;

FIGURE 3 is a sectional view showing the path the load carrying members take in their travel in mesh with one set of sprockets (not shown in FIGURE 3);

FIGURE 6 is a sectional view showing one of the brackets in detail;

FIGURE 7 is a sectional view taken along line 7—7 of FIGURE 5;

FIGURE 8 is a fragmentary plan view showing from above a portion of a conveyor like that shown in FIGURE 1 through 7, but showing a central support which is inclined with respect to the longitudinal direction;

FIGURE 9 is a sectional view taken along line 9—9 of FIGURE 8;

FIGURE 10 is a fragmentary elevational view of a conveyor showing load carrying members in the form of pans and load carrying members in the form of transverse supports for the pans; and FIGURE 11 is a fragmentary view showing the undersides of the pans and supports of FIGURE 10 which are interconnected by cables.

Figure 4:
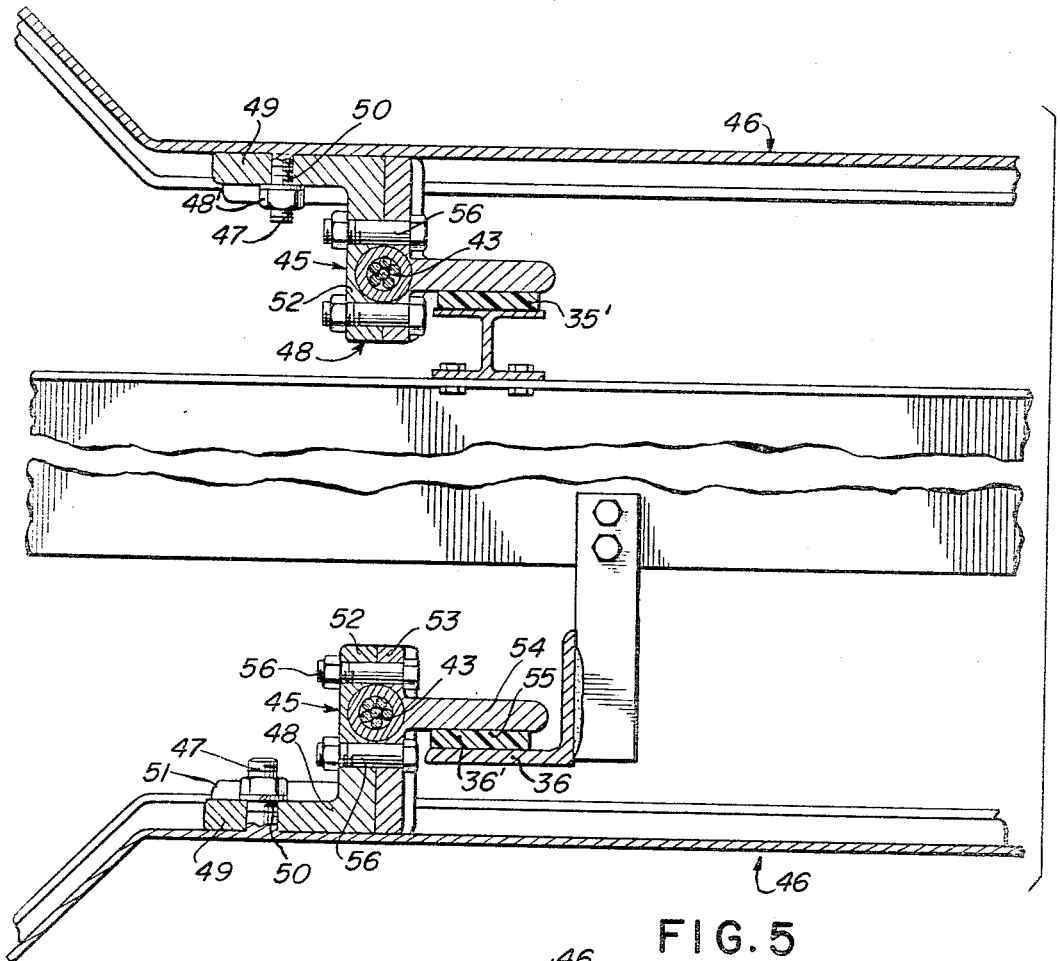
FIGURE 4 is an enlarged elevational view, partly broken away, showing in detail the manner in which brackets, secured to the load carrying members are connected to a cable and are supported by upper and lower side supports.

Referring now more particularly to FIGURES 1 through 7 of the drawings, there is shown a conveyor generally indicated at 20 having a longitudinally extending frame indicated at 21 having opposed side plates 22 and 23 and standards 24. A shaft 25, driven by any suitable means, is rotatably mounted in plates 22 and 23 at one end of the frame 21, and an idler shaft 26 is rotatably mounted in plates 22 and 23 at the other end of the frame 21. The idler shaft 26 is received by bearings 27 and 28 mounted for longitudinal movement in the plates 22 and 23, respectively. Adjusting screws 29 cooperate with blocks 30, only one of which is shown, so that the bearings 27 and 28 can be adjusted to move the shaft 26 toward and away from the shaft 25. Opposed sprocket-like drive members 32 are secured to the shaft 25 at each side of the frame 21, while opposed sprocket-like drive members 33 are secured to the shaft 26 at each side of the frame 21.

The frame 21 has transversely extending braces 34 connected at their ends to the plates 22 and 23. Longitudinal upper supports 35 are disposed near each side of the frame 21, while lower supports 36 are disposed below and parallel to the upper supports 35, near sides of the frame 21. A support 37 is disposed in a generally central zone between the upper supports 35 and also extends in a longitudinal direction. The supports 35, 36 and 37 have wear strips 35', 36' and 37' suitably secured to and supported by the supports 35, 36, and 37. The wear strips 35', 36' and 37' are preferably composed of a non-metallic material having a low coefficient of friction, such as polytetrafluoroethylene known commercially as "Teflon" or material disclosed in catalog Bulletin 150, of the Arguto Oilless Bearing Company, Philadelphia, Pa. and identified as an "Arguto-K" self-lubricated wear strip.

Sprockets 32 and 33 have the same configuration and hence the same reference characters are applied to each. The sprockets 32 and 33 each include a hub 38. Toothed segments 38' are secured to the hub 38 by threaded fasteners 40. Each of the segments 38' includes two teeth 41. The teeth 41 have V-shaped grooves 42. When the segments are mounted to the hub 38 of the sprocket 32 or 33, the grooves 42 in the teeth 41 enable the sprockets 32 to serve also as pulleys. Endless flexible drive members in the form of cables 43 and 44 are trained over related sprockets 32 and 33. Screws 29 can be adjusted to take up slack in the cables 43 and 44.

Figure 5:
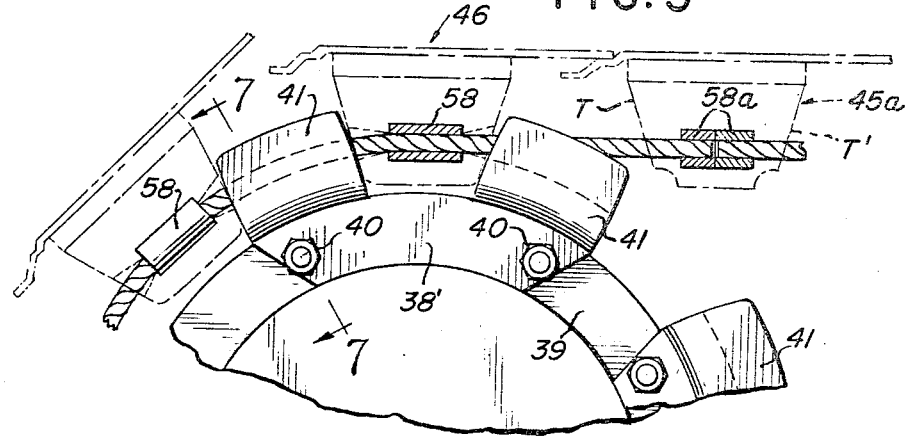
FIGURE 5 is a fragmentary view showing the load carrying members and brackets in phantom lines and showing the relation of the cable and lugs to the brackets.

Brackets generally indicated at 45 are secured to the ends of transversely extending load carrying members generally indicated at 46 by means of threaded studs 47 secured to the undersides of the load carrying members 46 and nuts 48'. The threaded studs 47 are welded to the load carrying members 46. Each bracket 45 includes a generally angle-shaped member 48, one leg of which lies against the underside of its related load carrying member 46. The leg 49 has two bores 50 through which the threaded studs 47 extend. The leg 49 of each bracket 45 includes a central stiffening rib 51 situated generally between the bores 50. The angle-shaped member 48 also includes a leg 52 which extends generally perpendicularly to the load carrying member 46. A member 53 is shown to be disposed in face-to-face relationship with the leg 52 and to have a flange 54, which extends transversely from the member 53 in the same direction as its associated load carrying member 46. The flange 54 has lower and upper surfaces 55 which bear against and are supported for sliding movement by the upper surfaces, of the wear strips 35' and 36'. Threaded fasteners 56 secure the members 48 and 53 together. The leg 52 and the member 53 each have semi-cylindrical recesses which complement each other to form a cylindrical recess or enlarged bore portion which can snugly receive lugs 58 which securely clinch the cables 43 and 44. The end lugs 58a are shown in FIGURES 5 and 6 to be in abutting end-to-end relationship. Each of the lugs 58 fills the cylindrical cavity in each of the brackets 45, while the two end-to-end lugs 58a together fill the cylindrical cavity in the bracket 45a. The bracket 45a containing the lugs 58a is permanently identified by being different from the other brackets 45 in physical appearance, and in particular, the bracket 45a has a pair of nicks or cutouts 45b which distinguish the bracket 45a from the brackets 45. One such bracket 45a is provided for each of the cables 43 and 44 to connect the end lugs 58a. Thus, the user or service man is always aware of the location of the ends of the cables 43 and 44. It is usual to subject a viscera table conveyor to fluids such as hot and cold water, blood, intestinal juices and the like, so making a cutout directly in the bracket to which the end is attached permanently identifies the end of the related cable. The brackets 45 and 45a have outwardly flaring passage portions 59 and 60 formed partly in their legs 52 and partly in their members 53 which prevent the cables 43 and 44 from undergoing sharp bending as the cables 43 and 44 move around their respective sprockets 32 and 33. The brackets 45 and 45a have sides T and T' which can engage or mesh with the teeth 41, thus each of the brackets 45 and 45a also serves as a tooth.

The transverse load carrying members 46 in the form of slats each have a planar portion 61, which accounts for most of the width of the load carrying member 46, and a marginal portion 62. Each marginal portion 62 includes a flange 63, the upper surface of which lies in a plane parallel to and below the upper surface of the planar portion 61 by a distance equal to the thickness of the planar portion 61 at its leading marginal edge. A web 64 joins the flange 63 to the planar portion 61. The flange 63 provides a shelf or ledge for supporting a leading marginal edge of the next adjacent load carrying member 46. As the upper surface of the flange 63 is disposed below the upper surface of the planar portion 61 by a distance equal to the thickness of the planar portion of the leading marginal edge of the adjacent load carrying member 46, the upper surface of adjacent planar portions 61 lie in planes both in its upper run U and its lower run L, except when the load carrying members 46 are traveling around the sprockets as are the four load carrying members 46 illustrated at the right in FIGURE 3. In this connection, it is seen that as the load carrying members 46 travel toward the end of the conveyor depicted by FIGURE 3, material cannot fall between adjacent load carrying members 46 because of horizontal overlap between the leading marginal edge of one member 46 and the trailing marginal edge of the adjacent member 46, and because of the inclinations of the various component upper surfaces of the load carrying members 46 passing around the sprockets 33.

The flange 65 has upper and lower surfaces which are disposed below and generally parallel to the upper surface of the flange 63. A web 66 joins the flange 65 to the flange 63. The web 66 is substantially longer than the web 64 to add stiffness and rigidity to the load carrying member 46 so that the metal of which the load carrying members 46 are composed, for example stainless steel, can be made as thin as possible. The underside of each flange 65 of each load carrying member 46 slides over and is supported by the wear strip 37' which is secured to the upper surface of the generally central support 37. The marginal portion 62 also includes the webs 64 and 66 and the flange 65.

Referring now to FIGURES 8 and 9 of the drawings there is shown an embodiment which is identical to the embodiment shown in FIGURES 1 through 7 in the drawings, except that the generally central support indicated at 37a, and having a wear strip 37a' at its upper surface, is not disposed parallel to the side supports 35 but is slightly inclined with respect to the side supports 35 in a longitudinal direction. Components shown in FIGURES 8 and 9 which are the same as those components shown in FIGURES 1 through 7, are indicated by the same reference characters. It is thus apparent that as the load carrying members 46 travel over the side supports 35 and the generally central support 37a the wear at the underside of the flange 65 is spread over a wider area than would be the case if the support 37a were parallel to the side supports 35 as in the embodiment of the FIGURES 1 through 7 of the drawings. Thus, wear at the flanges 65 is distributed over an area which is greater than the contact area of the upper surface of the wear strip.

Referring now to FIGURES 10 and 11 of the drawings there is shown an alternative embodiment of the conveyor illustrated in FIGURES 1 through 7, where load carrying members indicated generally at 67 and 68 are provided. The load carrying members 67 are shown to take the form of pans, each having a bottom wall 69 and a continuous side wall 70. Each of the load carrying members 68 is shown to have a planar portion 71 and a pair of depending flanges or stiffeners 72, the load carrying members 68 thus being channel-shaped in cross-section. The load carrying members 67 are secured to the cables 43 and 44 at spaced intervals by brackets 45'. Instead of the brackets 45' being secured directly to the bottoms 69 of the load carrying members 67, rigid plates 73 secured to each side of each load carrying member 67 as by spot welding have threaded studs 74 extending in a direction away from the plate 73 and through bracket 45' for connection to nuts 75. The brackets 45' are in all respects the same as the brackets 45, and the ends of the cables 43 and 44 in the embodiment of FIGURES 10 and 11 are connected to the other in the same way as depicted by FIGURES 5 and 6. Brackets 45" which are identical to the brackets 45 and 45' are secured to the planar portion 71 of the load carrying members 68. The brackets 45" are disposed at each side of the conveyor and are secured to the cables 43 and 44. As the brackets 45' and 45" are the same as the brackets 45 they are not described in detail other than to mention that these brackets have flanges 54' and 54" which can bear against and be supported for sliding movement by upper and lower side supports 35 and 36, respectively. It is seen that each load carrying member 68 supports adjacent load carrying members 67 at their marginal adjacent sides. Thus, not only are the load carrying members 67 mounted to the cables 43 and 44, but the load carrying members 68 also prevent the load carrying members 67 from tilting and tipping in such a manner that material would spill out of the pan-shaped load carrying members 67. As best shown in FIGURE 10, the load carrying members 68 do not in any way interfere with the passage of the cables 43 and 44 or the pans 67 around the sprockets at the opposite ends of the conveyor. In the embodiment of the invention illustrated in FIGURES 10 and 11 no central support such as 37 or 37a is provided as the primary load carrying members 67 are relatively rigid due to their pan-shaped configurations and because the cables 43 and 44 are relatively narrowly spaced apart.

As the wear strips 35', 36', and 37' are composed of a material which need not be lubricated with oil, grease or the like and as the cables 43 and 44 require no such lubrication either, and in fact only the bearings for the shafts 25 and 26 require lubrication, it can be appreciated that maintenance of the above described apparatus is at a minimum.

Other embodiments and modifications of this invention will suggest themselves to those skilled in the art, and all such of these as come within the spirit of this invention are included within its scope as best defined in the appended claims.

We claim:

1. In a conveyor: a frame, sprockets rotatably mounted at each end of said frame, each sprocket having an annular groove, a continuous cable trained over said opposed sprockets at each side of said frame in their respective grooves, upper and lower longitudinally extending supports at each side of said frame, an upper support in a generally central zone between said upper side supports, each of said supports having a wear strip at its upper surface, said wear strips each having a relatively low soefficient of friction, load carrying members extending transversely of said frame, each load carrying member having a planar portion and having a marginal portion underlying an adjacent load carrying member, each of said marginal portions including a first flange having a planar upper surface which supports an adjacent load carrying member, a first web joining said first flange and said planar portion and being dimensioned so that the upper surface of adjacent planar portions lie in a plane, a second flange having a lower surface in a plane generally parallel to and below the plane of said upper surface of said first flange for slidable engagement with said wear strips of said upper support in said generally central zone, a second web joining said first and second flanges, and brackets secured to the undersides of said load carrying members and said cables, each bracket including a flange having a bearing surface for sliding over said wear strips of said lower and upper side supports, respectively, said brackets being profiled to engage said teeth of said sprockets.

2. In a conveyor: a frame, sprockets rotatably mounted at each end of said frame, continuous cables trained over said sprockets, load carrying members extending transversely of said frame, longitudinally extending side supports for supporting said load carrying members and a support disposed between said side supports in a central zone for supporting said load carrying members for sliding movement, and brackets secured to the underside of each of said load carrying members and said cables, each of said brackets having a flange for slidable engagement with its related side support and having a profile to provide a tooth, each of said sprockets having teeth engageable with said teeth of said brackets.

3. In a conveyor: a one-piece conveyor slat having a flat transverse portion and a relatively narrow marginal portion, said marginal portion including a first flange having a flat surface lying in a plane spaced below a plane defined by the upper surface of said transverse portion by a distance approximately equal to the thickness of said flat transverse portion, a web joining said flange and said flat transverse portion, another flange having a flat lower surface lying in a plane generally parallel to and below the plane of said upper surface of said flat transverse portion, and another web which is longer than said first web joining said flanges.

4. In a conveyor: a frame, spaced drive members rotatably mounted in said frame, a continuous flexible drive member trained over said drive members, load carrying slats secured to said drive member, each slat including a generally flat portion having a leading edge and a marginal portion having a trailing edge, each marginal portion of each slat including a first flange having a generally flat upper surface which supports an adjacent slat, a first web joining said first flange and said flat portion and being dimensioned so that the upper surface of adjacent planar portions lie in a plane, a second flange having an upper surface in a plane generally parallel to and below the plane of said upper surface of said first flange, a second web joining said first and second flanges, said marginal portion being sufficiently wide so that as said slats travel around said drive member at the discharge end of said frame, the leading edge of one slat overhangs the trailing edge of an adjacent slat.

5. In a conveyor: a conveyor slat having a relatively wide transverse portion and a relatively narrow marginal portion, said marginal portion including a first flange having an upper surface lying in a plane spaced below a plane defined by the upper surface of said transverse portion by a distance approximately equal to the thickness of said transverse portion, a first web joining said first flange and said transverse portion, a second flange having a lower surface lying in a plane generally parallel to and below the plane of said upper surface of said first flange, and a second web joining said first and second flanges.

6. In a conveyor: an elongated conveyor slat for carrying a load and having a relatively wide transverse portion and a relatively narrow marginal portion, said marginal portion including a first flange having an upper surface lying in a plane spaced below a plane defined by the upper surface of said transverse portion by a distance approximately equal to the thickness of said transverse portion, a first web joining said first flange and said transverse portion, a second flange having a lower surface lying in a plane generally parallel to and below the plane of said upper surface of said first flange, a second web joining said first and second flanges, and a support having an upper surface for supporting the lower surface of said second flange for sliding movement.

7. In a conveyor: a longitudinally extending frame, at least one load carrying member movable in a longitudinal direction relative to said frame, and a support secured to said frame for slidably supporting said member at its under side, said support being inclined with respect to the longitudinal direction so that wear on the underside of said member is distributed over an area which is greater than the area of contact between said support and the underside of said member as said member slides over said support.

8. In a conveyor: a longitudinally extending frame, a load carrying member extending transversely of said frame, a bracket secured to the underside of said load carrying member, said bracket having a flange, a support secured to said frame for supporting said flange for sliding movement, said bracket including a bore including an enlarged portion, and means extending into said bore and having a lug nested in said enlarged portion for moving said load carrying member along said support.

9. In a conveyor: a longitudinally extending frame, rotatably mounted sprockets at each end of said frame, transversely spaced endless cables trained around said sprockets, pans disposed along said endless cables transverse supports disposed along said cable for supporting adjacent marginal portions of adjacent pans at their undersides, said pans and said transverse supports being alternately arranged along said endless flexible drive members, a bracket secured to each side of each pan and to each side of each transverse support, each bracket being secured to one of said cables, each bracket having a flange, transversely spaced, longitudinally extending supports mounted in said frame, said flanges having bearing surfaces which can bear against said longitudinal supports.

References Cited by the Examiner

UNITED STATES PATENTS

| | | | |
|---|---|---|---|
| 480,496 | 8/1892 | Garland | 198—200 |
| 527,722 | 10/1894 | Sargent et al. | 198—199 |
| 892,740 | 7/1908 | Koob | 198—195 |
| 1,823,370 | 9/1931 | Meem | 198—196 X |
| 1,971,553 | 8/1934 | Fisk | 198—195 |
| 2,747,725 | 5/1956 | Hatch et al. | 198—195 |
| 2,944,660 | 7/1960 | Johnston | 198—195 |
| 3,214,007 | 10/1965 | Matthies et al. | 198—195 |

FOREIGN PATENTS 501,588 11/1954 Italy.

EVON C. BLUNK, *Primary Examiner.*

M. L. AJEMAN, *Assistant Examiner.*